United States Patent [19]

Cole et al.

[11] Patent Number: 5,523,749

[45] Date of Patent: Jun. 4, 1996

[54] IDENTIFICATION SYSTEM FOR SIMULTANEOUSLY INTERROGATED LABELS

[75] Inventors: Peter H. Cole, West Lakes Shore, Australia; Leigh H. Turner, Singapore, Singapore

[73] Assignee: Integrated Silicon Design Pty. Ltd., Adelaide, Australia

[21] Appl. No.: 122,526

[22] PCT Filed: Apr. 3, 1992

[86] PCT No.: PCT/AU92/00143

§ 371 Date: Sep. 28, 1993

§ 102(e) Date: Sep. 28, 1993

[87] PCT Pub. No.: WO92/17866

PCT Pub. Date: Oct. 15, 1992

[30] Foreign Application Priority Data

Apr. 3, 1991 [AU] Australia ................................. PK5386

[51] Int. Cl.$^6$ ........................................................ H04Q 7/00
[52] U.S. Cl. ...................................... 340/825.54; 340/572
[58] Field of Search ............................... 340/825.54, 572; 342/44, 51

[56] References Cited

U.S. PATENT DOCUMENTS

| | | |
|---|---|---|
| 1,744,036 | 1/1930 | Brard . |
| 2,927,321 | 3/1960 | Harris . |
| 3,088,106 | 4/1963 | Kingsford-Smith . |
| 3,299,424 | 1/1967 | Vinding . |
| 3,426,349 | 2/1969 | Gareis . |
| 3,448,440 | 6/1969 | Wiegand . |
| 3,755,803 | 8/1973 | Cole et al. . |
| 3,816,709 | 6/1974 | Walton . |
| 4,040,053 | 8/1977 | Olsson . |
| 4,075,632 | 2/1978 | Baldwin et al. . |
| 4,196,418 | 4/1980 | Kip et al. . |
| 4,274,090 | 6/1981 | Cooper . |
| 4,314,373 | 2/1982 | Sellers . |
| 4,333,072 | 6/1982 | Beigel . |
| 4,361,153 | 11/1982 | Slocum et al. . |
| 4,509,039 | 4/1985 | Dowdle . |
| 4,546,241 | 10/1985 | Walton . |
| 4,580,041 | 4/1986 | Walton . |
| 4,602,253 | 7/1986 | Kreft . |
| 4,623,877 | 11/1986 | Buckens . |

(List continued on next page.)

FOREIGN PATENT DOCUMENTS

| | | |
|---|---|---|
| 625753 | 11/1988 | Australia . |
| 614795 | 12/1988 | Australia . |
| 635198 | 12/1988 | Australia . |
| 626539 | 3/1989 | Australia . |
| 624377 | 4/1989 | Australia . |
| 0324564 | 1/1989 | European Pat. Off. . |
| 0387071 | 3/1990 | European Pat. Off. . |
| 3101207 | 1/1981 | Germany . |

*Primary Examiner*—Donald J. Yusko
*Assistant Examiner*—Edward Merz
*Attorney, Agent, or Firm*—Larson and Taylor

[57] ABSTRACT

An identification system having an electronic label for processing articles such as baggage or carrier cargo. The system uses the principle of electromagnetic communication in which an interrogator containing a transmitter generates an electromagnetic field through which the electronic label containing a label receiving antenna may pass. The electronic label is attached to the article being processed and includes means for sensing the electromagnetic field and means for generating intermittently repeated label reply signals. The system includes a receiver for detecting and decoding the label reply signal. The electronic label replies intermittently as long as it is within the electromagnetic field, and the field is maintained for a period of time which is greater than the time interval between the intermittently repeated label replies. The electronic label also includes means for determining the interval between the intermittently repeated label reply signals without reference to timing signals external to the label. The interval between label reply signals varies from label to label and is greater than the time required for a label reply.

14 Claims, 8 Drawing Sheets

U.S. PATENT DOCUMENTS

| | | |
|---|---|---|
| 4,635,041 | 1/1987 | Maimann et al. . |
| 4,654,658 | 3/1987 | Walton . |
| 4,668,942 | 5/1987 | Eccleston et al. . |
| 4,751,516 | 6/1988 | Lichtblau . |
| 4,769,631 | 9/1988 | Copeland . |
| 4,888,579 | 12/1989 | ReMine et al. . |
| 4,912,471 | 3/1990 | Tyburski et al. ................... 340/825.54 |
| 5,005,014 | 4/1991 | Jasinski ............................... 340/825.54 |
| 5,019,813 | 5/1991 | Kip et al. . |
| 5,072,222 | 12/1991 | Fockens . |
| 5,105,190 | 4/1992 | Kip et al. . |
| 5,121,103 | 6/1992 | Minasy et al. . |
| 5,150,114 | 9/1992 | Johansson .......................... 340/825.54 |

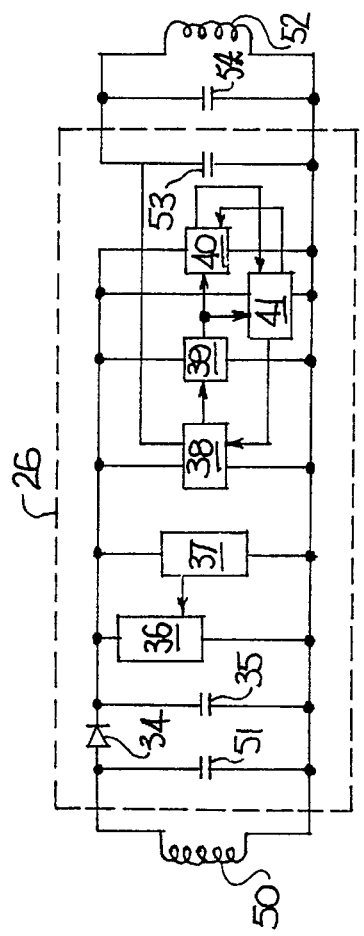
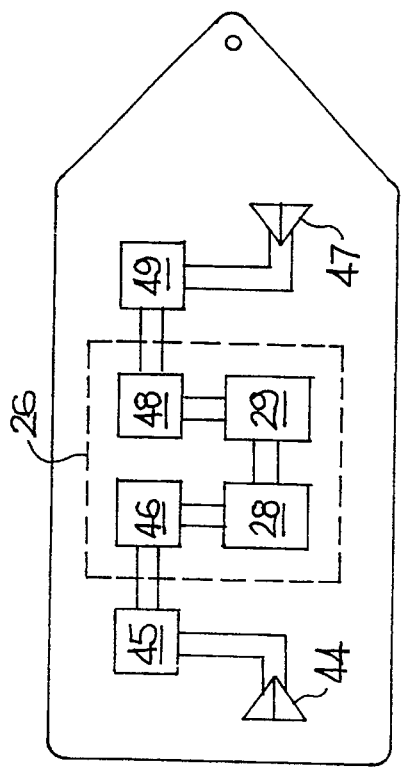
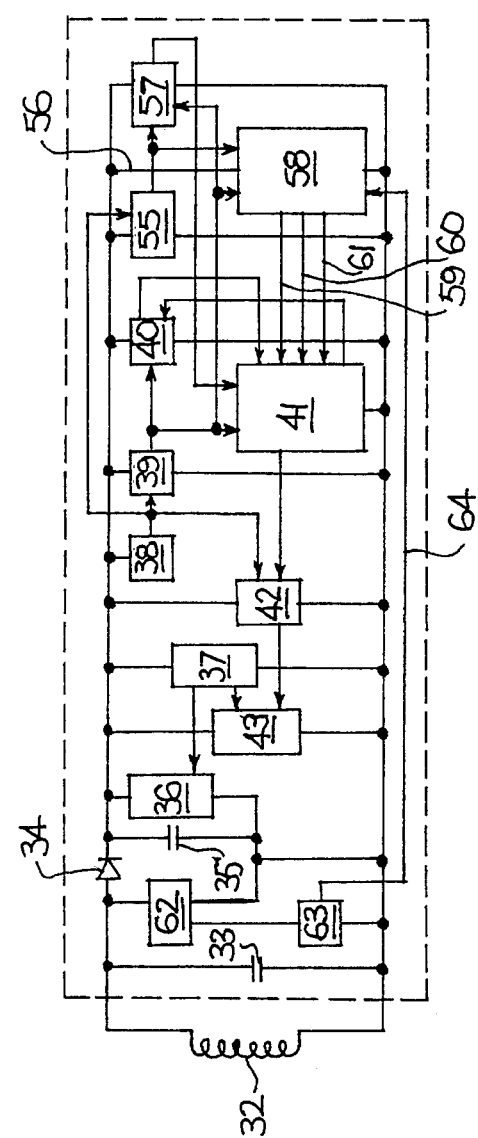

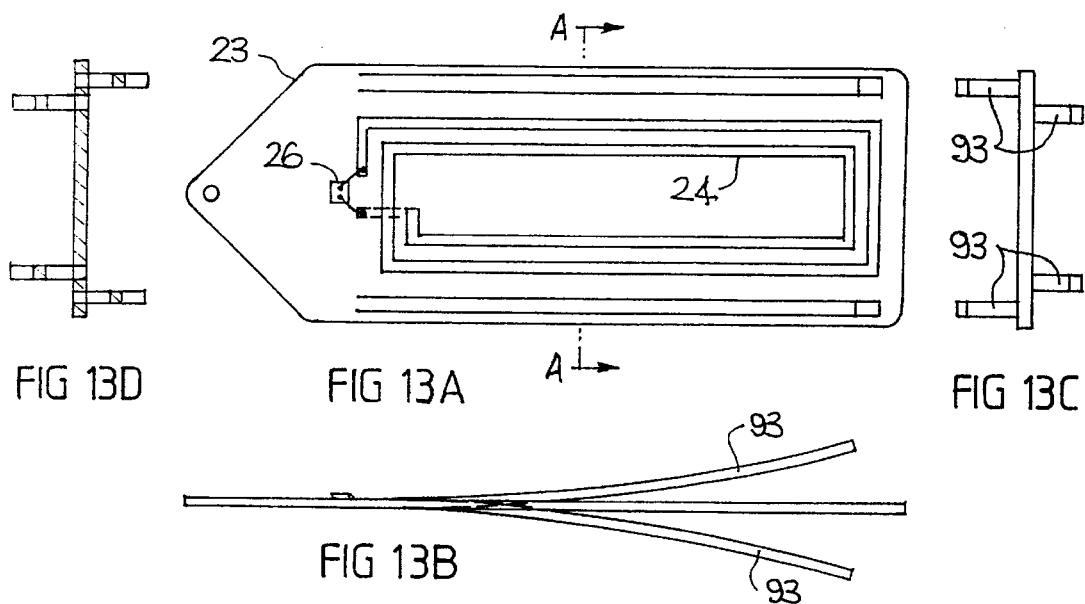
FIG 13D  FIG 13A  FIG 13C
FIG 13B
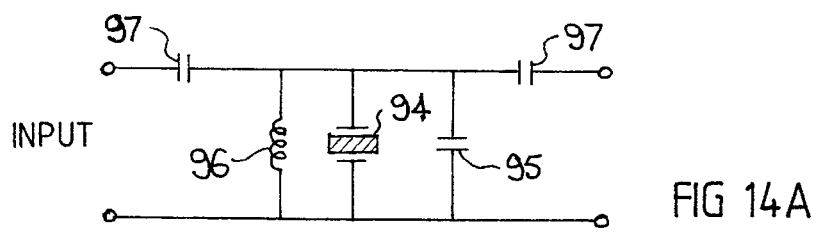
FIG 14A
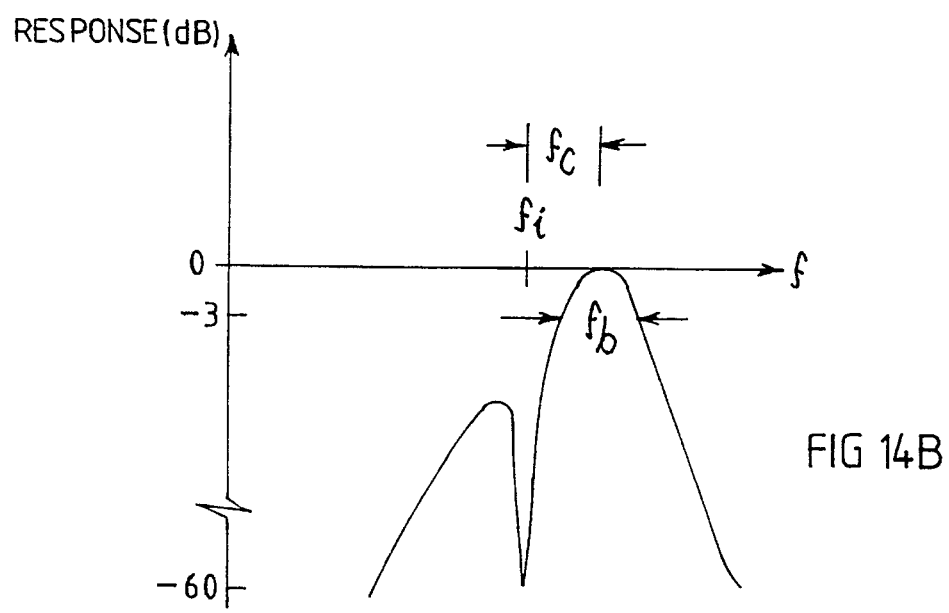
FIG 14B

IDENTIFICATION SYSTEM FOR SIMULTANEOUSLY INTERROGATED LABELS

BACKGROUND OF THE INVENTION

1. Field of the Invention

The present invention relates to a system for handling of articles such as baggage or carrier cargo. In particular the invention relates to a system for automated identification of articles wherein an electronic sub system called an interrogator including a transmitter and receiver extracts by electromagnetic means useful information from an electronically coded label attached to such articles as they are processed through sorting operations eg. at an airport or node of a cargo handling organisation.

Although the present invention is herein described with reference to a baggage/cargo sorting system it is to be appreciated that it is not thereby limited to such applications. Thus the sorting system of the present invention may be applied to material handling operations generally eg. sorting of stock or parts.

2. Description of the Prior Art

A block diagram of the type of system to which the invention relates is shown in FIG. 1. This system uses the principle of electromagnetic communication in which an interrogator containing a transmitter generates an electromagnetic signal which is transmitted via an interrogator antenna system to an electronic label containing a label receiving antenna. The label antenna receives a proportion of the transmitted energy and through a rectifier generates a dc power supply for operation of a reply generation circuit connected either to the label receiving antenna or a separate label reply antenna with the result that an information bearing electromagnetic reply signal is radiated by the label.

As a result of electromagnetic coupling between the label and interrogator antennae, a portion of a time-varying radio frequency signal is transmitted by the label antenna and may enter the interrogator antenna, and in a signal separator located within the interrogator be separated from the signal transmitted by the interrogator, and passed to a receiver wherein it is amplified, decoded and presented via a microcontroller in digital or analog form to other systems such as a host computer or a system of sorting gates which make use of the information provided by the interrogator.

In the label, operations of the reply generation circuit may be controlled in time by an oscillator, the output of which may be used either directly or after reduction in frequency by a divider circuit to control the code generator circuit and a reply interval generator circuit. The code generator circuit may control a modulator circuit which may present a time-varying impedance varying in accordance with the modulation signal either directly to the receiver antenna or to the rectifier, or may present a modulated reply carrier signal to a reply antenna. The code generator circuit may alternatively present to the receiver antenna or to the rectifier a reply signal without carrier wave. The reply interval generator circuit may control timing signals to the code generator circuit or to the modulator circuit so that the reply signal is radiated by the label for only a portion of the time for which the label is interrogated.

Propagation of electromagnetic signals between the interrogator antenna system and the label antenna may be constrained to take place within a field confinement structure which may be used to enhance the coupling of energy between the interrogator antenna system and the label antenna, and may also be used to diminish unwanted propagation of interrogator energy beyond the region desired for interrogation. The interrogator antenna system may be connected to the interrogator via an antenna re-configuration switch, either mechanical or electronic, which allows the nature of the interrogation field created by the interrogator antenna system at the position of the label to be changed in magnitude and direction. Such antenna re-configuration may be automatic over time or may be under control of the microcontroller within the interrogator.

Within the interrogator the transmitter may generate, in addition to the signals supplied to the interrogator antenna system, reference signals supplied to the receiver and may also generate signals supplied to a field cancellation system which may be placed externally to the field confinement system or to the region occupied by the interrogator antenna system, and may serve to reduce the net propagation of interrogation signals beyond the region desired for interrogation. The signals supplied to the field cancellation system may be fixed in nature or may be varied under control of the microcontroller which may receive signals from a field sensing system which samples the unwanted propagating signals in regions external to the interrogation region.

Within the interrogator the microcontroller may perform in addition to the operations discussed various calculation and control functions such as functional testing of the system components and may also participate in the reply decoding process.

In the design of practical systems for cargo and baggage handling several problems can arise. One problem is that of discrimination between replies which can come simultaneously from identification labels attached to different objects simultaneously present in the interrogation field. The usual solution to this problem is to ensure that the interrogation field is created at a very low frequency, below the broadcast band, by a near-field dipole antenna in which the interrogation field strength diminishes as approximately the third power of the distance from the antenna to the label, and to simultaneously ensure that differently labelled objects are sufficiently separated in their passage through the identification apparatus for the field of the interrogator to excite only one label at a time. When such sufficient separation is not provided, replies from different tags interfere one with another, and incorrect readings, or a failure to read a label, can occur.

A further problem is caused by orientation sensitivity of magnetic field sensitive label antennae to low frequency interrogation fields. The problem is compounded by unpredictability of construction of objects to which labels are to be attached, and the modification to the field created by the interrogator which can occur in commonly occurring situations. An example is provided by the metal clad suitcase, upon the surface of which eddy currents are created by the interrogation field, so that the resulting oscillating magnetic field in the vicinity of the surface is constrained to lie parallel to that surface. This field re-orientation, together with the fact that planar coil label antennae are insensitive to a magnetic field within their plane, causes low frequency labels which lie close to and parallel to such metal surfaces not to respond. It is also the case that simply configured magnetic field creating antennae generate field configurations with symmetry planes through which a conveyor borne label can pass without at any stage achieving strong coupling to the interrogation field.

A further problem is that of achieving an interrogation field which provides an acceptably low level of interference to other users of the electromagnetic spectrum. Commonly used solutions to this problem consist of either the use of interrogation frequencies well below the broadcast band, at which frequencies radiation restrictions are generally less stringent than at higher frequencies, and for which radiation from magnetic field producing antennae of size useful in interrogation of labels attached to person-portable objects is small, or the use of UHF or microwave frequencies where in some countries bands allowing greater stray radiation are defined.

However, each of these solutions has disadvantages in respect of both label manufacturing cost and performance. When interrogation frequencies below the broadcast band are used, label antennae require finely etched patterns of many turns to achieve the required induced voltages, and generally also require installation in the label of resonating capacitors which are of a size impractical either to apply separately at low cost or to manufacture in monolithic integrated circuit form. Moreover the use of such low frequencies renders the weak label replies which also occur at low frequency difficult to distinguish against a relatively high level of electromagnetic background noise present in all urban environments.

When UHF or microwave frequencies are used, circuit components which will perform all the functions required to extract energy from the interrogation signal and generate a reply become impossible both to manufacture inexpensively and to incorporate into a single integrated circuit manufacturing process, with the result that label manufacturing costs again become unacceptable for mass application. At these frequencies there is the additional problem that reflections of interrogation energy and multi-path propagation can generate concentrations of interrogation energy at regions outside the intended interrogation region, and ambiguities of the source of a reply can occur. Such frequencies also suffer from both screening by well-conducting objects and attenuation by partially conducting objects when the identifying label happens to be positioned with an obstructed view of the interrogation antenna.

The problems described above are compounded when the objective of obtaining from licensing authorities type approval rather than individually licensed approval of automated identification and sorting installations, particularly in a sensitive location such as an airport, is considered. For type approval, radiation of the interrogation energy beyond the interrogation area is required to be kept at a particularly low level, while at the same time, because the label contains no energy source so that manufacturing costs may be kept low, the interrogation field is required to be strong enough to allow the label to derive its operating power therefrom. These two requirements are substantially in conflict.

Further problems arise from the weak reply which occurs in passive labels as just described. In the presence of a weak reply, there is a need to prevent extraneous noise from the environment from entering the receiver where it may mask the reply. There is a need also to prevent excessive amounts of the strong interrogation signal from entering the receiver wherein it may either do damage, or through saturation of mixer or amplifier elements, reduce sensitivity.

The usual method of keeping excessive interrogation power from entering the receiver is to employ a transmitter-receiver signal duplexer in the form of a directional coupler, a circulator or a bridge circuit. Such circuit elements only provide the necessary degree of isolation when carefully adjusted to achieve an appropriate match between the input impedance of the antenna structure, and a characteristic impedance of the duplexer structure. Even when such isolation is achieved by careful adjustment, introduction of objects to be sorted of significant size within the field of the interrogator antenna system will change its impedance properties by a sufficient amount to destroy the isolation achieved. The problem is not significantly alleviated by using separate transmitter and receiver elements because the factors just mentioned make maintenance of a high degree of isolation between such elements impossible to maintain.

As well as producing a loss of sensitivity of the receiver due to saturation, lack of sufficient isolation between transmitter and receiver paths can produce other undesirable effects. It is frequently the case that in order to enhance the coupling between label and interrogation apparatus, a single label antenna operating over a relatively narrow frequency band is used, and the reply signals occupy a portion of the electromagnetic spectrum close to the transmitted spectrum. In this situation phase noise inevitably present in the transmitter signal will appear as background noise in the receiver channel, and will provide an unwelcome limitation to sensitivity.

Further problems arise in the receiver structure normally used as a means of avoiding effects of low frequency phase noise in either transmitter or receiver local oscillator. The receiver structure normally used is the homodyne receiver in which the same oscillator is used as the primary generator of transmitted signal and as a local oscillator for the down-converting mixer in the receiver. Such receivers have the benefit of avoiding the effects of low frequency phase noise which arise when separate transmitter and receiver local oscillators are used.

However, homodyne receivers have the property that the phase between the reply signal and the local oscillator presented to the down-converting mixer is relevant to performance, in that when those two signals are in quadrature, there is no mixer output in the desired output passband. When very low interrogation frequencies are used, the requirement to maintain an appropriate phase relationship between the reply signal and the receiver local oscillator can be achieved by initial design and adjustment of the interrogator circuits. As, however, interrogation frequency rises toward the higher values desired to allow low-cost processes to be employed in manufacture of labels, phase shifts, due to the movement of objects to be identified within the scanning field and time delays in the propagation path between the label and interrogator antennas, make the phase of the reply reaching the receiver mixer uncertain, and positions of the label occur for which effectively no reply is seen. Measures need to be taken to deal with this matter.

The usual measure is to split the reply signal into two halves which are down-converted in frequency in separate mixers, the local oscillator signals fed to those mixers being in phase quadrature. The output signals from the mixers are then either re-combined after one is modified to suffer a further phase shift over the relevant band, or are separately decoded, and compared in amplitude and in the decoded result, before a decision is made on whether a correct reply has been received. Each of these measures has its shortcomings, either in distortion of the signal envelope in the in-phase and quadrature channel recombination process, or in introducing additional complexity to the interrogator through the requirement to provide circuits for processing of split signals down to and including the decoding operation.

SUMMARY OF THE INVENTION

The present invention provides an interrogation system which permits labels of low manufacturing cost to be used in a convenient interrogation environment providing clarity in the definition of the region of space from which a reply is detected, good discrimination between labels attached to objects of all separations, and provides a sufficiently low stray interrogation field to comply with type approval licensing requirements in all countries.

The present invention may provide a label interrogation environment in the form of a metallic wall tube, known below as an interrogation tunnel, of cross sectional dimension less than half a wave length at the interrogation frequency, through which a non-metallic conveyor carrying objects to be sorted may pass. The tunnel, through operating as a waveguide beyond cut-off, may provide an interrogation field confinement structure to limit the escape into the external environment of unwanted amounts of interrogation energy, and may also provide screening of the antenna receiving the label replies from externally generated interfering signals. The tunnel, through its capacity substantially to limit interrogation energy to within its boundaries, may also provide for more efficient generation of an interrogation field with limited total interrogator power, and may provide interrogation field shaping to enhance discrimination between replies from labels attached to adjacent objects submitted for identification.

In the provision of an interrogation field confinement structure as described above, attenuation of the interrogation field at the points where objects to be identified enter and exit the tunnel may be enhanced by insertion within the tunnel walls, at positions between the interrogation antenna system and the ends of the tunnel, of structures known as chokes and having the form of quarter wave length co-axial lines, which inhibit the passage of wall currents, supporting the fields interior to the tunnel, from passing along the tunnel walls in a direction of its axis.

An advantage of the use of an interrogation frequency and interrogation field confinement structure as described above is that the region of space from which replies can occur is more sharply defined than when higher frequencies, which are subject to reflection from the environment and multi-path propagation, are used. A further advantage of the use of such frequencies and confinement structure is that both screening by well-conducting objects and attenuation by partially conducting objects which occurs with higher interrogation frequencies when the identifying label happens to be positioned with an obstructed view of the interrogation antenna are avoided.

In the interrogation field confinement structure, antennae which create the interrogation field or receive the label replies may take the form of posts in metal walled chambers attached to the tunnel and communicating therewith through openings in the chamber and tunnel walls, or may take the form of rods or bars of magnetic material placed either in such chambers or against the interior of the tunnel walls.

The present invention may provide for the creation of a label interrogation field by means of a current carrying loop which may be placed adjacent to or surround the conveyor carrying objects to be sorted. Such loop may be tuned by capacitors and may be loaded by resistors either to present a more convenient driving impedance or to diminish the effect of detuning or losses introduced by objects to be sorted as they pass by or through the loop.

In the tuning of such loop the tuning capacitors may be placed at a single point or may be distributed over the circumference of the loop to improve distribution of current within the loop which would otherwise be made non-uniform through the operation of its self-capacitance, or to reduce build up of dangerous voltages which can occur when the required series reactance is placed at a single tuning point. When a distribution of series tuning capacitors around the circumference is employed, benefits of reduced radiation of electromagnetic fields to distant points, and reduced pickup of noise from surrounding electric fields, are also obtained.

The present invention may also employ for the creation of the interrogation field a plurality of field creation loops carrying similar currents which are adjusted in magnitude and phase to generate near to the loops an appropriate interrogation field strength, combined with diminished radiation to far points. Such field creation structures have the advantage that stronger interrogation fields can be created while still complying with stringent restrictions on generation of stray fields set by licensing authorities.

The present invention may also employ in either the screened or unscreened field creation structures described above either fixed or adaptive far-field cancellation antennae also excited from the interrogator. The benefit of such components is that the field reduction provided by either a tunnel structure or a system of similar-magnitude suitably-phased loops may be insufficient to meet the more stringent licensing regulations, particularly when the disturbance to fixed field configurations caused by the entry of objects to be sorted into the interrogation field is considered.

The present invention may also provide interrogation field creation systems which may either through adjustment of separate signals provided by the interrogator to the antenna elements or through operation of an antenna system re-configuration switch change the nature of the interrogation field established by the interrogation antenna system, in respect of the direction of the major component of the field and in the position at which it is strongest. The advantage of such interrogation field re-configuration is that labels which are unfavourably oriented or positioned in respect of one field configuration and which suffer risk of not replying with sufficient strength to be read will be strongly read by a re-configured field.

The present invention may also provide for minimisation of label read failures by employing substantially magnetic field sensitive label antennae, together with a label design such that labels will not naturally lie flat against metal clad objects.

The present invention may also minimise label read failures or misreads though adaptive control of interrogator power. Such control may be used to elicit replies from unfavourably oriented tags. To minimise risk of damage to or misreads from other labels simultaneously in an iterrogation field which has been temporarily increased in power level to stimulate an unfavourably oriented or positioned label, the invention may also provide circuits within the label to ensure correct and undamaged operation of the label over a large dynamic range of interrogation filed strength.

The present invention may also employ for control of timing operations within the label an oscillator built into the microcircuit which performs the reply generating operations. As the interrogator frequency may from other considerations be required to be much greater than any frequency required to control timing operations in reply generation, the use of such an oscillator may avoid excessive consumption in high speed counting circuits within the label of the small amount of power received by the label which can occur when timing operations are derived by the detection and frequency division within the label of the interrogation frequency. This provision can thus make more of the label received power available for provision of the reply.

The present invention also provides for simultaneous unamibiguous detection and decoding of replies from several labels which may inadvertently be positioned at one time in the interrogation field. Such simultaneous detection is of extreme importance in security checking of articles such as airline baggage where it is important for human safety to identify every baggage item loaded on an aircraft.

The present invention may also provide through control of various aspects of label response with power level and possibly also through control of interrogation power level, measures for greater discrimination between replies from closely spaced items being sorted.

The present invention may also provide for greater sensitivity in reading weak replies in the face of strong environmental noise, in the face of strong interrogation signals and in the face of disturbances to optimum adjustment of the interrogation system which will inevitably occur through the introduction of objects to be sorted of an unpredictable nature and significant size into the interrogation field, and may provide for the achievement of these objectives with a variety of reply modulation methods which may include either frequency or phase shift keying.

The present invention may also provide for avoidance of apparently null response positions in the interrogation field which can arise in some receiver systems as a result of phase shifts in the interrogation and reply signal propagation paths.

The present invention may also provide for maintenance of system performance and economy of interrogator power when objects which can significantly detune the interrogation antenna enter the scanned region.

The present invention may also provide for convenient and secure programming or re-programming of all or part of label information either at the time a label is first brought into use or dynamically during its subsequent deployment in sorting operations.

The present invention may also provide for assured separate detection of and correct reading of all replies from labels which are simultaneously present in the interrogation field, even when such labels have virtually identical electronic performance and are programmed with identical information content.

BRIEF DESCRIPTION OF THE DRAWINGS

Preferred embodiments of the invention will now be described with reference to the accompanying drawings wherein:

FIG. 5 shows further detail of circuit functions provided in another form of a coded label;

FIG. 6 shows further detail of circuit functions provided in yet another form of a coded label;

FIG. 7 shows further detail of circuit functions provided in a still further form of a coded label;

FIGS. 13A–13D show construction of an inexpensive label which will not lie flat against metal surfaces; and FIGS. 14A–14B show the construction and response of a receiver filter providing for suppression of strong interrogation signals, for elimination in homodyne receivers of positional nulls in the detection of label replies, and for minimisation of the effects of external noise.

DESCRIPTION OF THE PREFERRED EMBODIMENTS

Figure 1:
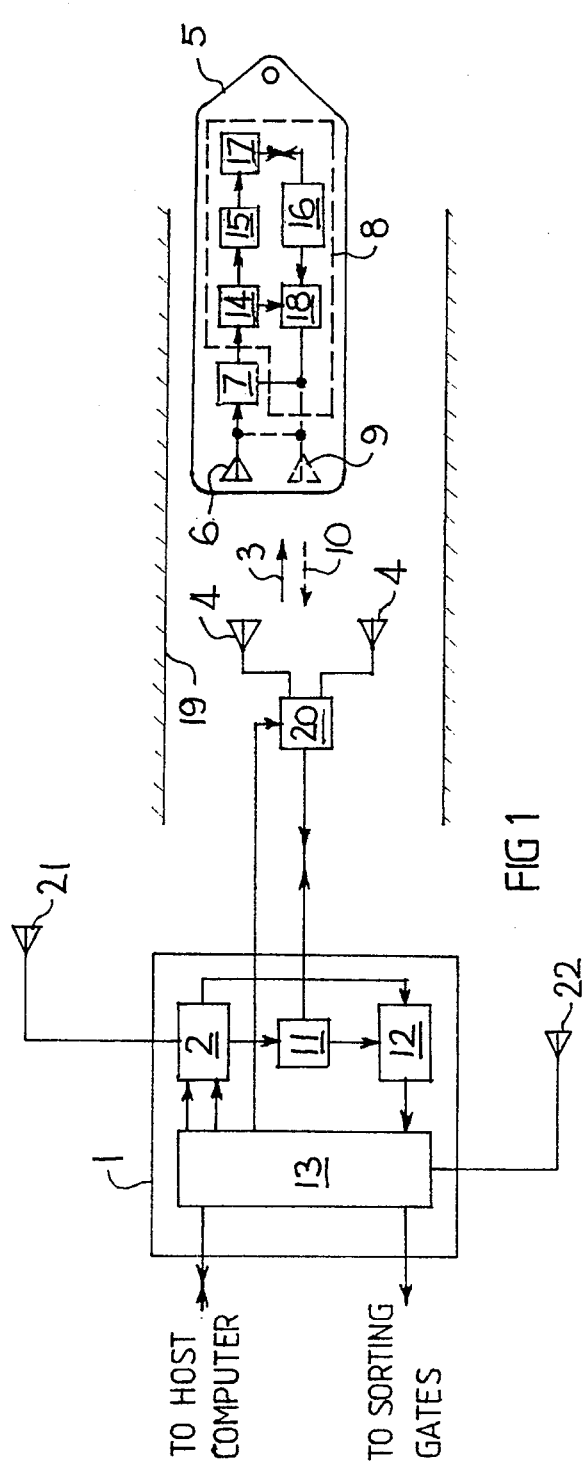
FIG. 1 shows major sub-units of an electronic label identification system in a baggage or cargo sorting application.

FIG. 1 shows an arrangement of an interrogator system in which an interrogator 1 containing a transmitter 2 generates an electromagnetic signal 3 which is transmitted via an interrogator antenna system 4 to an electronic label 5 containing a label receiving antenna 6. The label antenna 5 receives a proportion of the transmitted energy and through operation of a rectifier 7 generates a dc power supply for operation of a reply generation circuit 8 connected either to the label receiving antenna 6 or a separate label reply antenna 9 with the result that the an information bearing electromagnetic reply signal 10 is radiated by the label 5.

As a result of electromagnetic coupling between the label and interrogator antennae, a portion of a time-varying radio frequency signal transmitted by the label antenna 9 may enter the interrogator antenna 4 and in a signal separator 11 located within the interrogator 1 be separated from the signal transmitted by the interrogator 1 and passed to a receiver 12 wherein it is amplified, decoded and presented via a microcontroller 13 in digital or analog form to other systems such as a host computer or a system of sorting gates which make use of the information provided by the interrogator.

In the label 5, operations of the reply generation circuit 8 may be controlled in time by an oscillator 14, the output of which may be used either directly or after reduction in frequency by a divider circuit 15 to control a code generator circuit 16 and a reply interval generator circuit 17. The code generator circuit 16 may control a modulator circuit 18 which may present a time-varying impedance varying in accordance with the modulation signal, either directly to the receiving antenna 6 or to the rectifier 7 or may apply a modulated reply carrier voltage to reply antenna 9. The code generator circuit may alternatively present an impedance directly varing in accord with the reply signal, either to the receiving antenna 6 or to the rectifier 7, or may present a reply signal directly to a separate reply antenna 9. The reply interval generator circuit 17 may control timing signals to the code generator circuit 16 or to the modulator circuit 18 so that the reply signal is radiated by the label 5 for only a portion of the time for which the label 5 is interrogated.

Propagation of electromagnetic signals between the interrogator antenna system 4 and the label antenna 6 may be constrained to take place within a field confinement structure 19 which may be used to enhance coupling of energy between the interrogator antenna system 4 and the label antenna 6, and may also be used to diminish unwanted propagation of interrogator energy beyond the region desired for interrogation. The interrogator antenna system 4 may be connected to the interrogator 1 via an antenna re-configuration switch 20, either mechanical or electronic, which allows the nature of the interrogation field created by the interrogator antenna system 4 at the position of the label 5 to be changed in magnitude and direction. Such antenna re-configuration may be automatic over time or may be under control of the microcontroller 13 within the interrogator 1.

Within the interrogator 1 the transmitter 2 may generate, in addition to the signals supplied to the interrogator antenna system 4, reference signals supplied to the receiver 12 and may also generate signals supplied to a field cancellation system 21 which may be placed externally to the field confinement system 19 or externally to the region occupied by the interrogator antenna system 4, and may serve to reduce net propagation of interrogation signals beyond the region desired for interrogation. The signals supplied to the field cancellation system 21 may be fixed in nature or may be varied under control of the microcontroller 13 which may receive signals from a field sensing system 22 which samples unwanted propagating signals in regions external to the interrogation region.

Within the interrogator 1 the microcontroller 13 may perform in addition to those discussed various calculation and control functions such as functional testing of system components and may also participate in the reply decoding process.

Figure 2:
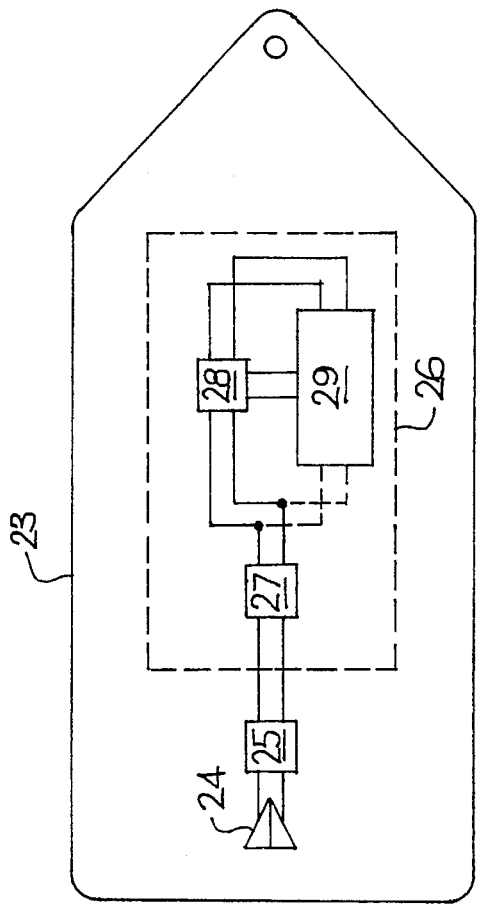
FIG. 2 shows a block diagram of one form of coded label.

FIG. 2 shows one preferred embodiment of a coded label. In the preferred embodiment shown in FIG. 2 a label body 23 is constructed from a laminate of thin cardboard and plastics film. The coded label includes a label antenna 24 comprising an aluminium foil pattern embossed on to the plastics film, as does printed matching element 25. Depending upon the style of antenna element and matching element used, one or both sides of the laminate may carry aluminium conductors, and through-connections may be made by stamped holes filled with conductive adhesive. Depending upon antenna style, operating frequency, and space available within the integrated microcircuit 26, the printed matching element may be absent and is desirably so. Neither the antenna 24 or the matching element 25 require conductors of fine resolution nor positioning.

The antenna 24 and matching element 25 are connected to the integrated microcircuit 26 via a pair of terminals, conductive adhesive being again the preferred mode of connection. Within the integrated microcircuit 26 an integrated matching element 27, preferably a capacitor, is connected in parallel with the antenna 24 and printed matching element 25 terminals. The system of antenna 24, printed matching element 25 and integrated matching element 27 may form a resonant circuit at the interrogation frequency so that coupling between the interrogator and the label is enhanced.

The signal developed across the just mentioned resonant circuit is conveyed within the microcircuit 26 to an integrated rectifier 28 in which both rectifier diode and reservoir capacitor are manufactured as part of the microcircuit fabrication process. The voltage developed across a resevoir capacitor of the rectifier system is fed to a reply generation circuit 29 the output of which is conveyed either directly to the antenna system or is presented to the rectifier system.

The operation of the rectifier circuit may be such as to draw from the label reply antenna non-sinusoidal currents, which may result in the emission from the label of signals at one or more of the harmonics of the interrogation frequency, these harmonic signals being detected by the interrogator.

Figure 3A:
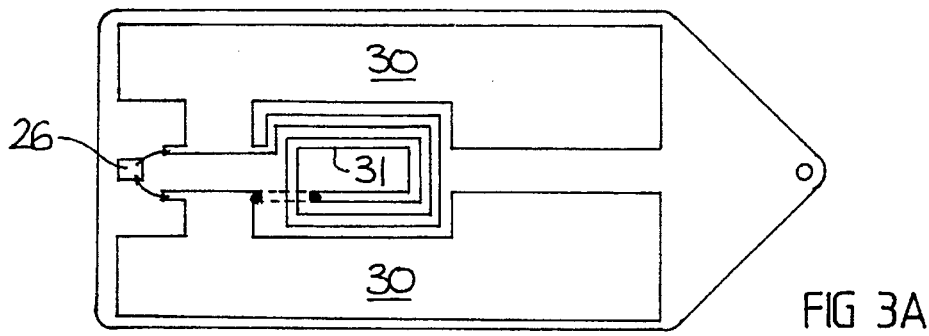
FIGS. 3A–3B show various forms of antenna suitable for use in low cost coded labels.
Figure 3B:
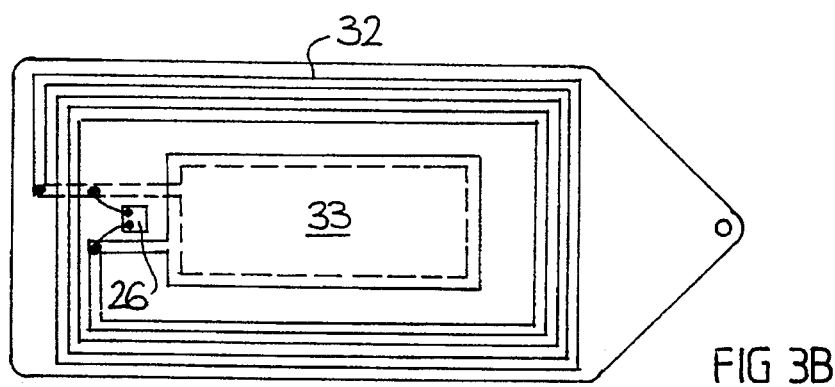

Preferred embodiments of label antennae and printed matching elements are shown in FIGS. 3A and 3B. In one preferred embodiment shown in FIG. 3A the label antenna is in the form of a electric dipole 30 again fabricated as stamped aluminium foil. The printed matching element takes the form of a rectangular spiral tuning inductor 31 connected in parallel with the antenna 30. The parallel combination is connected to the integrated microcircuit 26 via a pair of stamped aluminium foil conductors.

In another preferred embodiment shown in FIG. 3B the antenna consists of a magnetic dipole in the form of a large area spiral pattern loop 32 with only a small number of turns. The printed matching element takes the form of a tuning capacitor 33 fabricated as a pair of aluminium foil plates with the plastic film of the label body 23 as the dielectric. Necessary through-connections and connections to the microcircuit 26 are preferably made by stamped holes and conductive adhesive. At the preferred interrogator operating frequency of 27 MHz the rectangular portion of the label antenna can be 50 by 80 mm with the magnetic dipole containing four turns each of strip width 0.8 mm and spacing 0.8 mm, and the printed tuning capacitor is absent.

The ability to use low resolution printed antenna components and external matching elements, together with only a two-wire connection between the microcircuit, which may contain additional matching elements, and the antenna structure is in part a consequence of the choice of an operating frequency in the region of 3 to 30 MHz and has the advantage that label manufacturing costs are kept low.

Figure 4A:
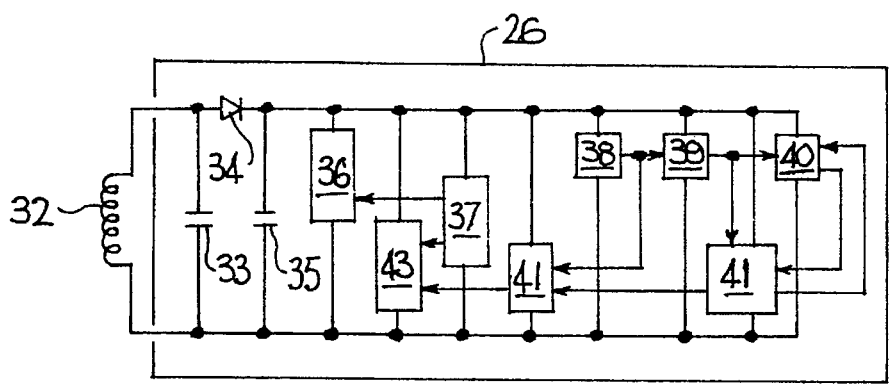
FIGS. 4A–4B show further detail of circuit functions provided in one form of a coded label.

More detail of the construction of the preferred embodiment of the label shown in FIG. 3B, and in particular of the functions performed within the integrated microcircuit, is shown in FIG. 4A.

In this preferred embodiment the reactance of the magnetic dipole antenna 32 is removed by an integrated matching element 33 consisting of a capacitor, preferably formed either with silicon dioxide dielectric between polysilicon layers or using gate oxide dielectric between a polysilicon layer and an implanted region of the substrate. The oscillating voltage developed across the antenna system is converted to a dc supply for the microcircuit 26 through the integrated rectifier diode 34 and integrated reservoir capacitor 35.

The output of rectifier 34 is presented to an unmodulated variable load 36. The unmodulated variable load 36 operates under control of a voltage sensor 37 so that as the voltage developed by the rectifier 34 rises above the value for optimum circuit operation, a decreasing impedance is presented by the unmodulated variable load 36 to the rectifier 34. The result of the additional loading will reduce the quality factor of the resonant circuit formed by the magnetic dipole antenna and its matching element with the result that the label will be protected against incorrect functioning or damage from strong interrogation fields which are encountered by labels which pass with optimum orientation close to the interrogator antenna.

The advantage of providing this feature is that interrogator fields of greater strength may be used, either fixed in time or adaptively varied, to elicit replies from badly positioned or orientated labels.

The voltage developed by the rectifier 34 is also presented to and powers an integrated circuit oscillator 38. In the preferred embodiment described here this oscillator will operate in the frequency range 180 kHz to 220 kHz, and will provide among other things a reply signal sub-carrier signal.

An advantage of using within the label an integrated oscillator to control timing operations is that the high power consumption associated with circuits which derive their timing from counting down the relatively high interrogation frequency is avoided, and more of the power present in the label is available for generating the reply or for controlling essential processes which generate the reply by backscatter of a portion of the energy received by the label antenna.

The output of integrated circuit oscillator 38 is fed to a bit rate divider 39 which in the preferred embodiment shown here will accomplish frequency division by a factor of 4. The output of the bit rate divider 39 is fed to a message interval circuit 40 which controls the operation of and receives information from a reply code generator circuit 41 containing a sixty-four bit reply code stored in a reply code memory. The information in the reply memory may be fixed in content at the time of manufacture, may be programmable at the time the label is brought into use, or may be re-programmed in operation, and may also contain a unique microcircuit serial number which may be made part of the reply or may be used for other purposes.

The information in the reply code memory may be fed, in part, at the bit rate, to a modulator circuit 42 in which the reply information is modulated upon a reply sub-carrier provided by the integrated circuit oscillator 38.

The relationship between the message interval circuit 40 and the reply code generator circuit 41 is in part as follows. When the circuit is in unpowered state and receives power from an interrogation signal, the message interval circuit 40 asserts a Reply Code Generate signal which is passed to the reply code generator 41 which then issues, at the reply bit rate, four repetitions of the reply information stored in the reply code memory to the modulator, and also issues appropriate information to be defined below to the message interval circuit. Other aspects of the interaction between the message interval circuit 40 and the reply code generator circuit 41 are discussed further below.

In the preferred embodiment being described here the output of the reply code generator 41 is combined with the output of the integrated circuit oscillator 38 in the modulator 42 to accomplish differential phase shift keying of the reply sub-carrier frequency, a phase change in the output of the modulator occurring at the end of each four cycles of the reply sub-carrier whenever the output of the reply code generator 41 is a binary zero.

The output of the modulator 42 together with the output of the voltage sensor 37 is applied to modulated variable load 43. This component presents to the power supply line a time-varying impedance which varies in accord with a signal from the phase modulator 42 and also varies with in amplitude with the signal derived from the voltage sensor 37. The result is that a time-varying loading is presented first to the rectifier 34 and is then presented by the rectifier 34 to the label antenna 32. It will there cause generation, through the mechanism of modulated backscatter described below, of a reply signal from the label.

In this embodiment the reply signal may consist of modulated sidebands of the interrogator signal or modulated sidebands of a harmonic of the interrogator signal.

The variable impedance presented to the label antenna will provide that a portion of the available power received by the antenna will not be transmitted to its rectifier load, but will be reflected back into the antenna, wherefrom it will be re-radiated in a time varying manner. This time varying re-radiated signal will consist of sidebands of the original interrogation frequency, separated therefrom by a frequency difference equal to the frequency of the integrated circuit oscillator. The sub-carrier signal represented by those sidebands will be phase modulated with the reply signal information at the rate of one bit per four cycles of sub-carrier frequency.

In the reply generation process described above, the amplitude of the impedance variation provided by the modulated variable load 43 is made dependent upon the output of the voltage sensor 37 so that, when an unmodulated variable load 43 presents a low impedance to rectifier 34, the relative level of unmodulated and modulated impedance may be approximately preserved, and the relative strength of the backscattered reply will not diminish.

The advantage of the method of reply code generation discussed above is that the label may be operated without damage or malfunction over a wide dynamic range of interrogation signal.

At the conclusion of the reply code generation period, the Reply Code Generate signal is de-asserted and the generation of a reply signal by the label temporarily ceases. However, during the reply code generate period the message interval circuit receives data, either the reply code or a microcircuit serial number, from the reply code generator, and uses that data to initialize the state of a random number generator which is used to determine the number of reply bit periods which elapse before the Reply Code Generate signal is re-asserted and the reply signal is re-radiated by the label.

In the preferred embodiment being described here, the interval between reply periods is designed to be pseudo-randomly distributed between zero and 40 ms. That interval provides on the average an adequate time for replies from other labels simultaneously in the interrogation field to occur without interfering with the reply from the label under discussion. Even when such interference between replies does on one occasion occur, the differently seeded pseudo-random distribution of reply intervals within different labels will ensure that the probability of this interference continuing to occur will with time become vanishingly small.

Figure 4B:
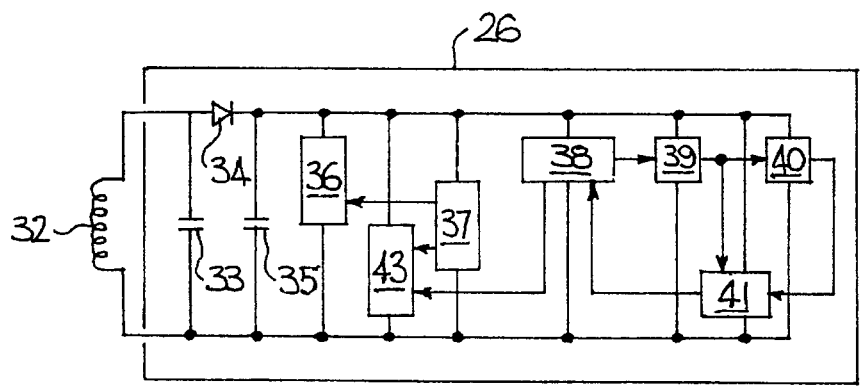

An alternative preferred embodiment of the label is provided in FIG. 4B. In this embodiment the reactance of the magnetic dipole antenna 32 is removed by the integrated tuning capacitor 33 placed within the integrated microcircuit 26. From the voltage developed across the antenna 32 and tuning capacitor 33 a power supply for the operation of the microcircuit is developed by the integrated rectifier diode 34 and integrated reservoir capacitor 35. Again an unmodulated variable load 36 operating under a control of voltage sensor 37 serves to keep the developed power supply within the microcircuit within acceptable levels in the face of large variations in strength of interrogator field. The power supply is again presented to a integrated circuit oscillator 38 which in this embodiment has an enhanced sensitivity of frequency to supply voltage and operates preferably in the range of 150 kHz to 250 kHz.

The output of the integrated circuit oscillator 38 is passed to a bit rate divider 39 and a message interval circuit 40. In this embodiment the message interval circuit 40 simply consists of a dual counter which alternately issues a high signal for 256 of the reply bit periods, and a low signal for 4096 reply bit periods.

The outputs of the bit rate divider 39 and the reply interval circuit 40 are both passed to a reply code generator 41 which performs functions similar to those described for FIG. 4A, except that the information from the reply code generator 41 is not in this case conveyed to the reply interval circuit 40. In this embodiment the output of the reply code generator 41 is presented to the integrated circuit oscillator 38 wherein it accomplishes, at the bit rate, changes to the oscillator frequency in addition to the relatively slow changes accomplished by variations in supply voltage.

The result is that the frequency of integrated circuit oscillator 38 is slowly varying with the microcircuit supply voltage and is in addition frequency modulated by the contents of a reply code memory within the reply code generator 41. The output of the integrated circuit oscillator 38 is presented, together with the output of the voltage sensor 37, to the modulated variable load 43 the operation of which is to generate through the mechanism of modulated backscatter, a reply code in the manner described in relation to FIG. 4A.

In the preferred embodiment described in relation to FIG. 4B the voltage dependence of the integrated circuit oscillator within the microcircuit operates, together with the fact that the reply message is intermittently issued at intervals which vary inversely with the frequency of that oscillator, to ensure that whenever several labels are present within interrogation field, the natural variation between label circuits, together with variation in strength of interrogation field from one position to another within the interrogation environment, replies from different tags within the field will not permanently overlap.

This feature of variation in the reply intervals between different labels may be enhanced by varying the power level of the interrogation field, as it is a property of most integrated circuit oscillators that the variation of oscillation frequency with power supply voltage increases as the supply voltage is reduced towards the threshold of oscillation.

By the deployment of the range of measures described the probability of failure to read all labels passing through the scanned environment may be reduced to a negligible value.

The advantage of this provision of a reply code interval in the ways discussed above together with other aspects of the invention such as the provision of enhanced dynamic range and adaptive control of interrogator power is that a high degree of probability may be attached to the ability of the system to read all labels passing through the interrogation field, even when labels are programmed to provide the same reply.

The basic structure of yet another preferred embodiment of the label is shown in FIG. 5. In this embodiment the receiving antenna 44 which received energy from the interrogation signal has its reactance removed by the combination of printed receiver matching element 45 and integrated receiver matching element 46.

The voltage developed across that combination of elements is converted to a dc supply by an integrated rectifier 28 within the integrated microcircuit 26 and supplies power to the integrated reply generation circuit 29. The integrated reply generation circuit 29 develops a phase modulated reply signal at a frequency unrelated to that of the interrogation signal. The reply signal is presented to the reply antenna 47, which has its reactance removed by the integrated reply matching element 48 and printed reply matching element 49.

In the preferred embodiment described here which is designed to operate with an interrogation frequency of 27 MHz the printed receiver matching element 45 may be absent. In the preferred embodiment described here the reply frequency is preferably one for which low power integrated oscillator circuits and low cost printed antenna elements are both practicable. In this preferred embodiment a frequency in the vicinity of 2 MHz is suitable.

Operations within the microcircuit of the embodiment shown in FIG. 5 are illustrated in FIG. 6. In this embodiment the receiving magnetic dipole antenna 50 again consists of a rectangular coil of four turns of stamped aluminium foil of strictly 0.8 mm in separation 0.8 mm. The label is interrogated at a preferred interrogation frequency of 27 MHz. The required integrated receiver tuning capacitor 51 contained within the integrated microcircuit 26 is preferably realised with polysilicon electrodes separated by silicon dioxide dielectric. The integrated rectifier diode 34 is formed between a p type implanted layer and an n type substrate with the reservoir capacitor again employing either polysilicon electrodes and silicon dioxide dielectric or gate oxide dielectric with one polysilicon electrode and an implanted region of the substrate as another. An unmodulated variable load 36, operating under voltage sensor 37, performs functions corresponding to those described in relation to the preferred embodiments of FIGS. 4A and 4B.

In this embodiment the integrated circuit oscillator 38 will operate at a frequency of approximately 2 MHz and will be reduced in frequency in a bit rate divider 39 by a factor of 32 to produce a bit period of nominally 16 microseconds. The output of the bit rate divider is passed to the message interval circuit 40, which operates as described previously in relation to FIG. 4A to provide an interval between replies effectively randomly distributed between zero and 40 ms.

During the active period the output of the reply code generator 41 varies between low and high states and accomplishes frequency modulation of the integrated circuit oscillator 38. During the inactive period the output of the integrated circuit oscillator 38 remains undisturbed, other than to follow its normal variations with respect to power supply.

In this embodiment the frequency modulated output of the integrated circuit oscillator 38 is presented directly to the transmitting magnetic dipole antenna 52 via additional output connections one of which is separate from those to the receiving magnetic dipole antenna 50. The reactance of the transmitting magnetic dipole 52 is removed by a combination of printed matching element 53 taking the form of an aluminium foil plastic dielectric capacitor and integrated tuning capacitor 54.

Operations within the microcircuit of another preferred embodiment of the label shown in FIG. 2 are shown in FIG. 7. In this embodiment when power is first applied by the interrogator to the circuit in an initially unpowered state, the sub-units 55, 57, 58, 63 and 64 are inactive and sub-units 32, 33, 34, 35, 36, 37, 38, 39, 40, 41, 43 function as described previously in relation to FIG. 4B to generate a reply.

When in this condition, however, the interrogator power is abruptly removed so that it falls in a period of five microseconds to a value of less than half the value established in providing the reply, and then in a period of ten microseconds is re-established, the voltage fall detector 55 detects this condition and sends an Enter Program Mode signal 56 to program charge pump 57 and program control circuit 58.

Upon the receipt of this signal the program charge pump 57 becomes active and begins to generate through the mechanism of charge pumping a programming voltage higher than the normal circuit operating voltage provided by the rectifier diode 34 and reservoir capacitor 35, and supplies that voltage to the reply code generator 41 which in this embodiment contains at least part of the reply code in an electrically re-programmable memory. At the same time the program control circuit 58 sends a signal to the reply code generator 41 to prevent until the programming process is complete the generation of the reply code.

For further operations in the microcircuit the interrogation signal must be modulated in amplitude with a depth of at least 20% and at a bit rate corresponding to the bit rate of the reply previously issued by the label. During this operation the interrogator power level is predictively adjusted to bring that bit rate to the nominal 50 kbits per second for this design of label.

The form of modulation of the interrogator power is pulse width modulation with a binary one being signalled by a high power level for a period of 15 microseconds followed by a low power level (less than 80% of full power) for a period of 5 microseconds, while a binary zero is signalled by a low power level (less than 80% of full power) for a period of 15 microseconds followed by a high power level for a period of 5 microseconds.

With the aid of the integrated circuit oscillator 38 to provide a timing reference, this form of modulation is detected by the voltage fall detector 55, and is passed to the program control circuit 58. That circuit records the first 64 binary digits signalled to the label and interprets them as a programming mode key. In this embodiment the interpretation of those digits employs the principle of feedback shift register encoding using the reply code as a key, so that for each label the correct value of the key depends upon its programmed contents and is calculated in the interrogator from the just received reply before it is issued. The advantage of this method of keying is that the relation between the code and the key may be kept confidential between the label manufacturer and accredited users, and greater security in the programming operation results.

Following the receipt of a correct programming mode key, the label interprets the next portion of the programming bit stream as data to be programmed into reply memory. Providing the conditions relating to Program Lock and Program Enable bits described below are satisfied, that data is then with the aid of Programming in Progress Signal 59, Write Data Signal 60, Write Enable Signal 61 entered into the reply code memory of reply code generator 41, taking a time appropriate to the programming speed of the memory. Upon the completion of the entry of the programmed data the reply code generation functions of the label are restored, and the interrogator checks that correct programming has taken place.

The operations described above will only occur when two bits of the reply code memory, known as the Program Enable Bit and the Program Lock Bit, are in the appropriate states. The Program Enable Bit, which can when the Auxiliary Programming Signal to be described below is applied, be both raised and lowered by the programming process described above, must be in a high state, while the Programming Lock Bit, which when the Auxiliary Programming Signal described below is applied can be raised by the programming process described above but once raised cannot be lowered by any means, must be in a low state.

For the Auxiliary Programming Signal to be asserted on the label a second electromagnetically coupled signal must be applied to the label antenna. This auxiliary signal is applied via a carrier at a frequency of approximately 500 MHz, and is applied to the label in a programming chamber which may take the form of a closed metal container or a waveguide beyond cut-off. The second electromagnetically coupled signal enters the label via the same terminal pair as the interrogation signal. Within the label use is made of the high ratio of the frequency of the second signal to the normal interrogation frequency for it to be separated in a multistage resistance-capacitance high-pass filter 62, whereupon it is rectified in rectifier 63 to generate the Programming Permit Signal 64 which is relayed to the programming control circuit 58 to accomplish the operations aforesaid.

The advantage in programming in the way described above are that: with a single and economical design of label, programming operations can be made highly secure; programming operations can include all variations from one-time programming to frequent re-programming of a label while in use; and as only a single terminal pair is used for connection of the label circuit to the antenna structure on the label body, label manufacturing costs are kept at a minimum.

Figure 8:
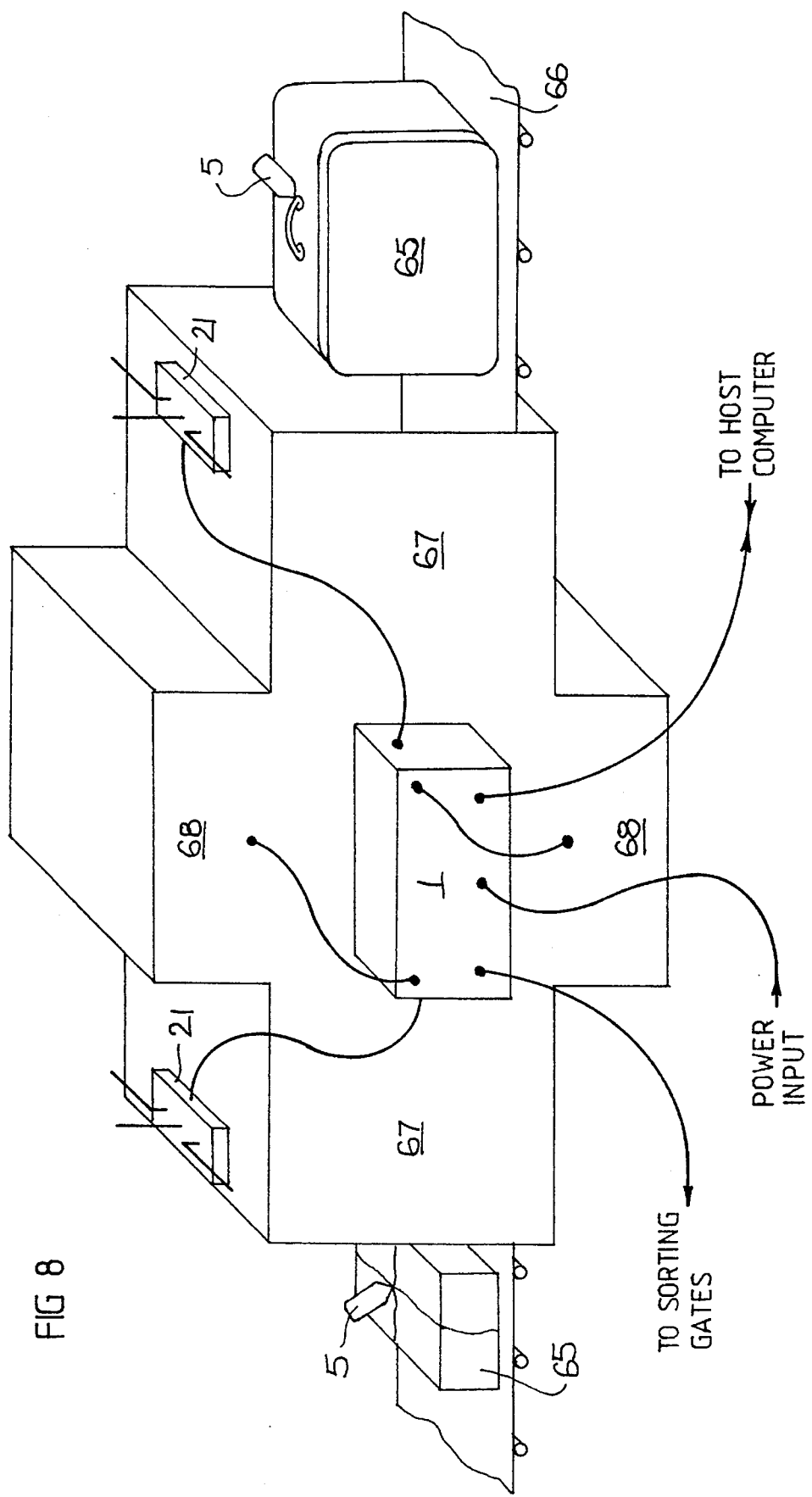
FIG. 8 shows an arrangement of components in an interrogation system employing a waveguide beyond cut-off as a field confinement structure and employing externally placed stray field cancellation antennae.

FIG. 8 shows a preferred embodiment of an object identification system containing a field confinement structure and a field cancellation structure. In this embodiment, baggage items 65 with attached electronic labels 5 are placed on non-metallic conveyor 66 through a rectangular metallic tunnel 67 which serves as the field confinement structure. In this embodiment the tunnel 67 has an interior width of 900 millimetres, an interior height of 1 metre, and a length of 2 metres, and interrogation takes place at a frequency of 27 MHz, at which frequency the electromagnetic wavelength is much greater than both aperture dimensions of the tunnel 67.

In this embodiment the interrogation field is created by rectangular bar antennae approximately 100 millimetres in square cross section, attached to each side wall and with a 20 millimetre gap at the centre providing a feed point for that antenna. From the feed point a coaxial line passes through the interior of one bar to the outside wall of the structure, thus permitting shielded connection of that antenna to the iterrogator 1. In this embodiment the fields created by the antennae are substantially magnetic and follow a path surrounding the antenna bars in closed loops. A portion of the field extends into the interior section of the tunnel 67 with the return flux path being provided by the metallic wall antenna housings 68 which provide a vertical expansion of the tunnel 67 cross section in the vicinity of its centre.

As well as being connected to the interrogation field creation antennae, the interrogator 1 has connections also to field cancellation antennae 21 placed close to each end of the tunnel mouth. The field cancellation antennae 21 are capable of radiating both vertically and horizontally polarized electromagnetic fields, the radiation being adjusted to cancel in the far field region of the residual radiation emerging from each end of the tunnel mouth.

The advantages of the provision of an interrogation field, field confinement structure and field cancellation system in the manner described above are manifold. They include the enabling of label manufacture at very low cost; the achievement of particularly low stray interrogation fields so that type approval of systems may be obtained; economy of power in the creation of interrogation fields of appropriate strength; the avoidance of multi-path ambiguities in the position from which replies have been obtained; elimination of reading failures from labels with an obstructed view of the interrogator antenna; and effectively complete elimination of effects of environmental noise.

In one preferred embodiment of the invention the interrogator 1 shown in FIG. 8 may contain a number of independent transmitter, receiver and reply decoder systems, connected separately to interrogator antennas 68, the outputs of the said decoder systems being combined in one of the decoders or in an overall system controller within the interrogator so that for each correctly decoded label a single report of its decoded reply is provided to the sorting gates or host computer.

In an alternative embodiment of the field creation structure the bars are increased in width to 300 mm and are driven in phase, or in quadrature. The adjustment of the configuration and phasing of the antennas, the overlap of the antenna fields, and the angular nature of the field enclosure where the antenna housings meet the tunnel side walls, all serve to create regions of rapid spatial variation in the amplitude and direction of the antenna field. This shaping of the antenna field has the advantage that replies from tags in particular orientations are confined to short intervals of time as a label passes through the antenna region with the result that the order of entry of labels into the interrogation region may be inferred with increased accuracy compared with field generation systems creating spatially more uniform fields.

Figure 9A:
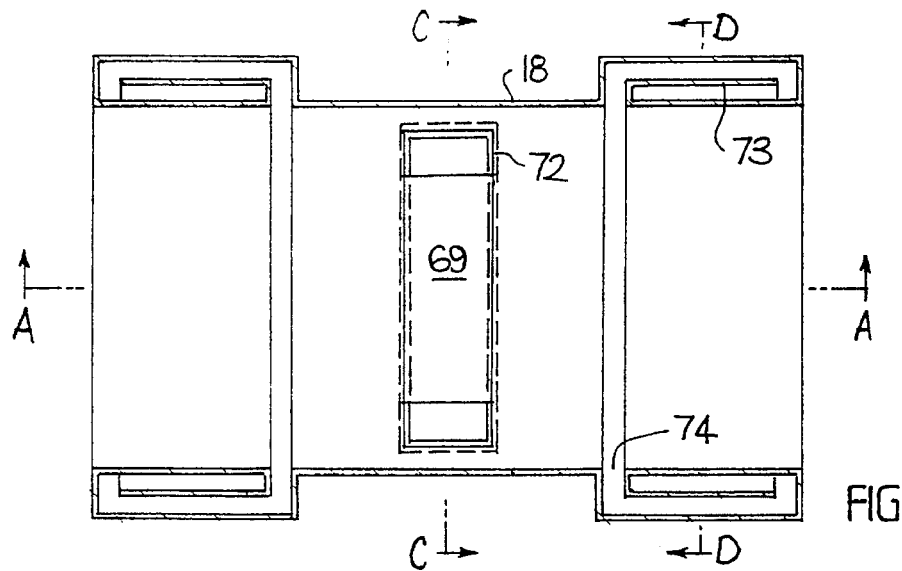
FIGS. 9A–9D show a field confinement structure employing chokes in the tunnel walls and also shows an arrangement of ferrite interrogation antennae.
Figure 9B:
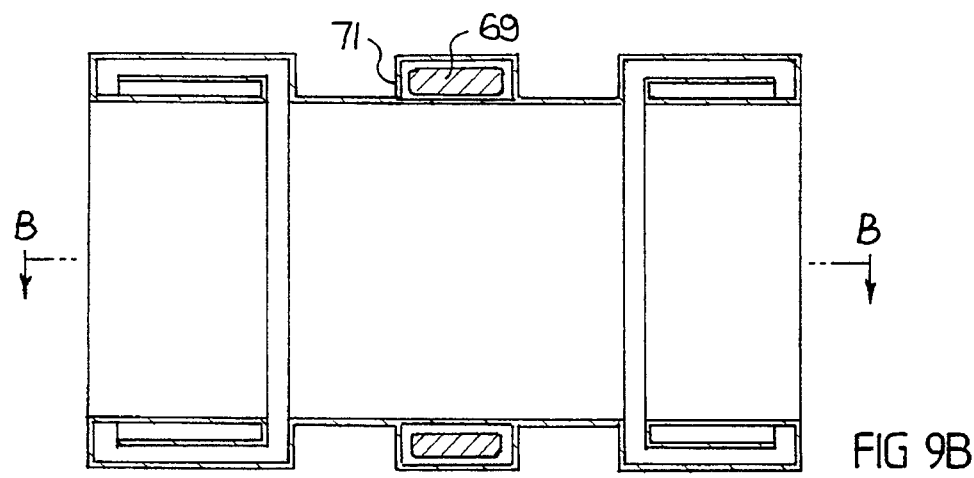
Figure 9C:
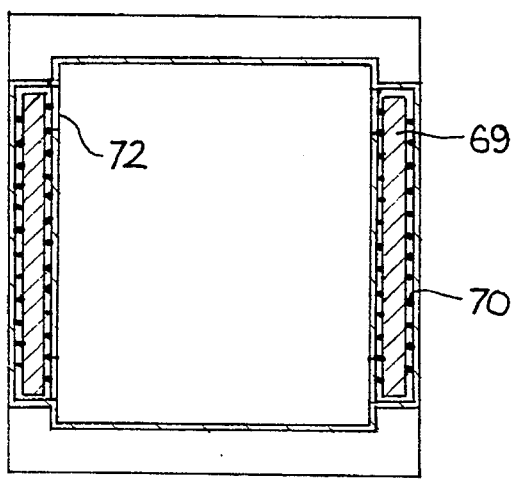
Figure 9D:
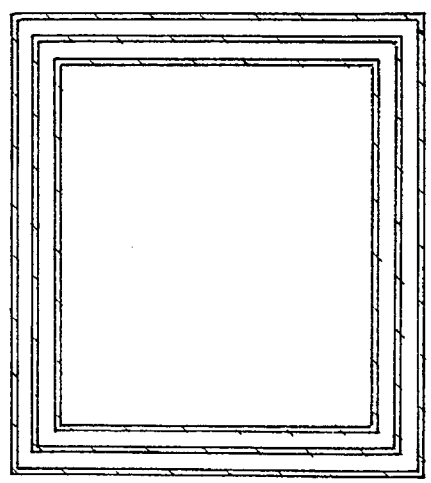

An alternative preferred embodiment of the field confinement structure and interrogation field antenna structure is illustrated in FIGS. 9A–9D. FIG. 9A shows a sectional view on BB of FIG. 9B and FIG. 9B shows a sectional view on AA of FIG. 9A. FIG. 9C shows a sectional view on CC of FIG. 9A and FIG. 9D shows a sectional view on DD of FIG. 9A. In this embodiment a waveguide beyond cut-off of dimensions similar to that discussed in FIG. 8 for an operating frequency of approximately 27 MHz is again used. However, in this embodiment the interrogation field creation antennae take the form of ferrite bars 69 excited by ferrite antenna windings 70 and placed in shallow chambers 71 exterior to the tunnel walls and of length a little less than the height of the tunnel, and communicating therewith through rectangular apertures 72 which provide an entry for the magnetic flux within the ferrite bars 69 generated by the antenna excitation system.

The confinement of the interrogation fields substantially to the region of the tunnel is achieved in part by again exploiting the properties of electromagnetic field distributions in waveguides beyond cut-off and in part by the insertion of current inhibiting chokes 73 in series with the tunnel walls between the region occupied by the interrogation antenna structure and the tunnel openings. The chokes illustrated take the form of a re-entrant coaxial lines, short circuited at one end and of total length one quarter of a wave length so that at the aperture 74 at which they connect to the interrupted tunnel walls an open circuit is presented.

These chokes 73 serve to inhibit the passage of wall currents across the gap and thus aid in the confinement of the interrogation field to the central region of the tunnel.

The advantages of the provision of an interrogation field and field confinement structure in this way are: that reduction of stray fields and reduction of environmental noise, even more than is provided by the previously discussed tunnel can be achieved; that more compact antennae can be realised; and that in consequence additional differently oriented antennae can be introduced, such antennae being operated in phase, in anti-phase or in quadrature to achieve minimization of weak field positions and unfavourable label orientations, all without significant penalty in the form of space occupied by the structure.

Figure 10:
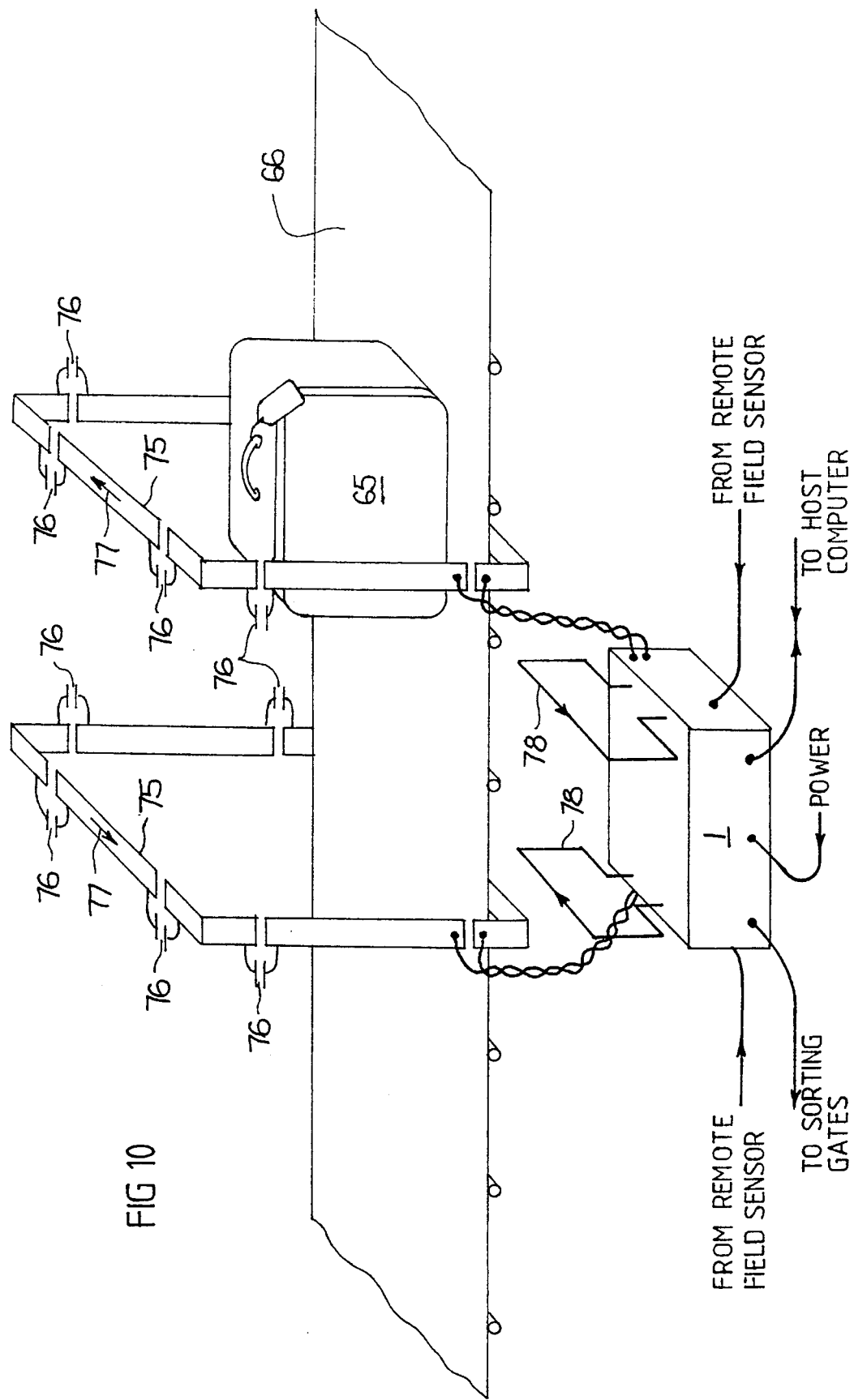
FIG. 10 shows an arrangement of interrogator antenna coils tuned to minimise build up of voltage and collection of extraneous noise, and also connected to reduce radiation to the far field, and also shows an interrogator system providing stray field cancellation.

A preferred embodiment of yet another type of interrogation field creation and cancellation structure is illustrated in FIG. 10. In this embodiment baggage items 65 carrying electronic labels 5 enter on a conveyer 66 which passes through a pair of single-turn portal interrogation antennae 75 in which reactance is removed by a number of series tuning capacitors 76 disposed at intervals around the circumference of the loops. The loop antennae are spaced in the direction of the conveyer by distance approximately equal to the width and are excited by the interrogator 1 so that currents 77 flow in opposite directions in the two loops. On top of the interrogator smaller but similarly oriented field cancellation antennae 78 are mounted.

In this embodiment the field created by the interrogation antenna system is substantially four pole in nature with a maximum logitudinal component in the center of each loop and a null field half way between them. In this embodiment the disposition of currents and the positions of the antennae are such as to minimize radiation to the far field. Such radiation as does occur is substantially cancelled by suitably phased additional currents which flow in the field cancellation antennae 78 mounted on the interrogator 1 or elsewhere if desired. The field cancellation antennae are sufficiently small for their own near fields not to significantly reduce the interrogation field at the label position.

The advantages of this form of field creation and stray field cancellation are: economy of space occupied by and economy in cost of manufacture of an interrogation installation; reduction in radiation of interrogation energy to far fields as a result firstly of the use of distributed series tuning capacitors, secondly as a result of the magnetic four pole nature of the field creation structure, and thirdly as a result of the stray field cancellation system, so that type approval of an interrogation installation may be more easily obtained; as a result of the distributed capacitance of the tuning system a reduction of both dangerous voltages and unwanted electric fields in the interrogation region; and as a consequence of the interrogation field distribution the obtaining of two interrogation opportunities for one pass of a label through the interrogation antenna structure. The field shaping which results from overlap of the antenna fields and the relative amplitude and phasing of the antenna currents to produce a field null between the loops offers the advantage of more accurate inference of relative label position as labels pass through the interrogation region.

Figure 11:
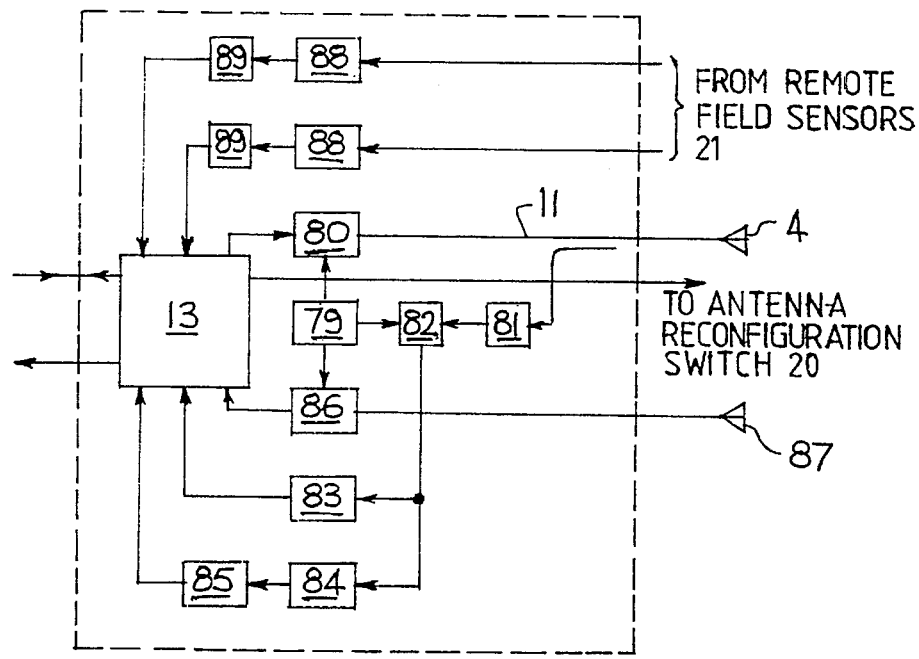
FIG. 11 shows a block diagram of an interrogator providing adaptive adjustment of interrogator power level in response to perceived label replies, and also providing stray field sensing and cancellation.

A block diagram of a preferred embodiment of an interrogator system is provided in FIG. 11. In this system the interrogation signal is generated by a local oscillator 79, increased in amplitude in a transmitter signal amplifier 80 and passed through signal separator 11 to interrogator antenna system 4.

The reply signal from the labels is received by the same interrogator antenna system and separated by signal separator 11 and passed via receiver filter 81 to balanced modulator 82. In the preferred embodiment the receiver filter provides very large attenuation, of the order of 60 dB, at the interrogation frequency while providing a passband 100 kHz wide situated 200 kHz above the interrogation frequency for the reply signal.

The advantages of a receiver filter with these properties are that: reduction in receiver sensitivity through saturation of the down-converting mixer is avoided; the introduction of interrogator signal phase noise into the receiver path is reduced; the influence of environmental noise in the receiver is reduced; and positional nulls in the label reply which result when double sideband homodyne reception is used are eliminated.

The balanced modulator 82 also receives a signal from the local oscillator 79 to effect down-conversion of the reply signal to a more convenient amplifying frequency. The output signal of balanced modulator 82 is passed to an amplitude detector system 83, the output of which enters microcontroller 13 to serve as an indication of whether replies have been obtained or some adjustment to interrogator power is required.

This adaptive adjustment of interrogator power has the advantage of eliciting replies from unfavourably oriented or positioned labels.

The output of balanced modulator 82 is also passed to a low frequency band pass amplitude limiting amplifier 84 which provides amplification in the region of the reply sub-carrier, and also provides suppression of small signals.

The advantage of using an amplitude limiting amplifier, and frequency or phase modulation in the encoding of the label reply, are that when more than one label has responded only the strongest supply is significantly present at its output, and that the preferably phase or frequency or modulated reply signals are presented at a suitable amplitude to signal sampler 85.

The signal sampler 85 takes limited resolution samples at a frequency significantly greater than the reply sub-carrier frequency so that a digital representation of the reply signal is passed to microcontroller 13. This method of operation offers advantages in that before the frequency or phase encoded reply information is extracted, decoding algorithms within microcontroller 13 can detect and compensate for time warping of the reply signal sub-carrier frequency which can occur as labels move through the interrogation field which varies in strength from position to position.

The microcontroller 13 also controls the gain of a cancellation signal amplifier 86 of which the input signal is the derived from the local oscillator 79 and the output signal is conveyed to field cancellation antennae 87 to give the advantage of minimisation of stray radiation which escapes the field confinement system. The level of the cancellation field is determined by the microcontroller 13 which receives information from stray field sensing antennae 21 via stray field sensing amplifiers 88 and stray field sensing detectors 89.

The microcontroller 13 may also control an antenna re-configuration switch which can place the excitations of antennae on opposite sides of the tunnel in phase, in antiphase or in quadrature to provide the advantage of minimization of weak field positions and unfavourable label orientations within the structure.

In an alternative preferred embodiment the receiver filter 81 provides its passband 200 kHz above or below the second harmonic of the interrogation frequency, and the balanced modulator 82 is fed with a local oscillator signal at the second harmonic of the interrogation signal.

An advantage of providing for reply detection in the band surrounding an harmonic of the interrogation signal is that harmonic energy and phase noise of the transmitter signal, which in homodyne receivers present a limit to system sensitivity, may in this elevated reply passband be easily removed from the transmitter signal by low cost filter circuits.

A further advantage of the use of a reply passband near an harmonic of the interrogation frequency is that local scattering systems such as electrically powered machinery which can interact readily with the interrogation signal to produce at sidebands of the interrogation frequency inteferring signals which can compete with the label reply, do not as readily produce interfering signals at sidebands an harmonic of the interrogation frequency, and label replies can be detected in the presence of strong local scatterers.

Figure 12:
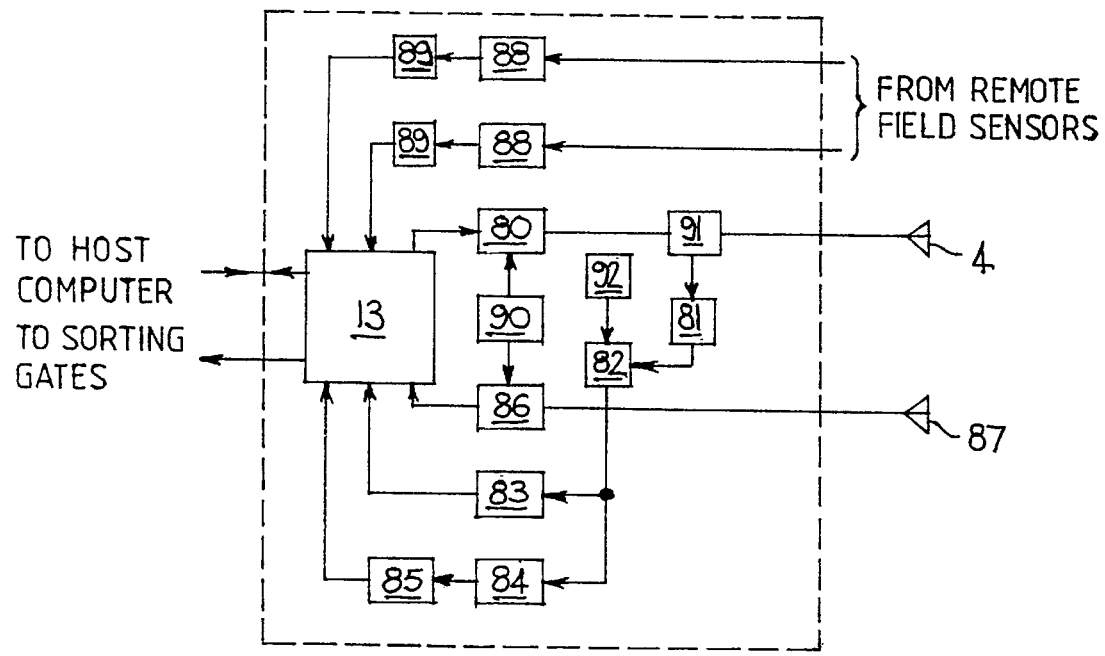
FIG. 12 shows a block diagram of another form of interrogator.

A block diagram of another preferred embodiment of an interrogator system is provided in FIG. 12. In this system the interrogation signal is generated by a transmitter master oscillator 90, increased in amplitude in a transmitter signal amplifier 80 and passed through frequency selective signal separator 91 to interrogator antenna system 4. The reply signal from the labels is received by the same interrogator antenna system and separated by signal separator 91 and passed via receiver filter 81 to balanced modulator 82. While no longer requiring a sharp notch at the interrogation frequency in its response, this receiver filter 81 has the task of sharply rejecting signals at the interrogation frequency while providing an appropriate passband for the reply signal.

The balanced modulator 82 also receives a signal from a receiver local oscillator 92 to effect down-conversion of the reply signal to a more convenient amplifying frequency.

The output signal to the balanced modulator 82 is passed to an amplitude detector system 83 the output of which enters the microcontroller 13 to serve as an indication of whether replies have been obtained or some adjustment to the interrogator power is required. The output of the balanced modulator 82 is also passed to a low frequency band pass amplitude limiting amplifier 84 which provides amplification in the region of the reply frequency base band and also suppression of small signals to ensure that when more than one label has responded only the strongest supply is significantly present at its output, and also to present the preferably frequency modulated reply signals at a suitable amplitude to the signal sampler 85. This component takes limited resolution samples at a frequency significantly greater than the reply sub-carrier frequency so that a digital representation of the reply signal is passed to the microcontroller 13. This method of operation offers the same advantages as were discussed in relation to FIG. 11.

The microcontroller 13 also controls the gain of a cancellation signal amplifier 86, the input signal of which is the derived from master oscillator 90 and the output signal is conveyed to field cancellation antennae 87 whose purpose is to cancel stray radiation which escapes the field confinement system. The level of the cancellation field is determined by the microcontroller 13 which receives information from stray field sensing antennae 21 via stray field sensing amplifiers 88 and stray field sensing detectors 89.

The advantages of this alternative form of interrogator are that the reply frequency can be uncoupled from the interrogation frequency as is provided for example by the preferred embodiment of label illustrated in FIGS. 5 and 6, and thus alternative means of elimination of interrogator noise from the receiver channel, which means are less sensitive to fine adjustment, become available.

The construction of a preferred variety of electronic label is shown in FIGS. 13A–13D. FIGS. 13A, 13B & 13C show plan, side elevation and end elevation views of the label. FIG. 13D shows a sectional view on AA of FIG. 13A. The label consists of a plastic label body 23 to which is attached a stamped metal foil antenna 24 connected to the integrated microcircuit 26. At each side of the label body spring strips 93 punched from the plastic body, still attached at one end, and curved as shown, protrude. These strips have the function of preventing the label in its natural state from lying flat against planar objects, and in particular metallic suitcases of cargo containers.

The advantage of this form of label is that, when the label is lying naturally against the object, good coupling to the interrogator fields which surround metal clad objects may be obtained.

The circuit diagram and frequency response when placed between fifty ohm source and load impedances of a receiver filter suitable for use in the interrogator defined in FIG. 11 and operating at an interrogation frequency of 27 MHz are shown in FIGS. 14A and 14B respectively.

The circuit shown in FIG. 14A consists of a piezoelectric crystal 94 with its series mode resonance set to the interrogation frequency $f_i$, in this case 27 MHz, with the combination of the crystal self capacitance (not explicitly shown in the circuit) and the added capacitance 95 being tuned by inductor 96 to a frequency an amount $f_c$ above the series mode resonance, where $f_c$ is the reply frequency sub-carrier.

The series capacitors 97 accomplish impedance transformation of the resonant circuit formed by the inductor 96, crystal capacitance and added capacitance 95 so that, in conjunction with the source and load impedances, between which the circuit is placed, the 3 dB bandwidth of the passband provided for the reply signal upper sideband is established to be 100 kHz, while the depth of the notch established at the interrogation frequency $f_i$ is at least 60 dB.

It will be appreciated that various alterations, modifications and/or additions may be introduced into the constructions and arrangements of parts previously described without departing from the spirit or ambit of the present invention.

We claim:

1. An identification and telemetry system comprising:

an interrogator including a transmitter for generating an interrogation electromagnetic field through which code responding labels may pass;

at least one code responding label including a label receiving antenna, means for sensing the interrogation electromagnetic field and means for generating intermittently repeated label reply signals; and a receiver for detecting and decoding said label reply signals;

said at least one label replying intermittently as long as said at least one label is within the interrogation electromagnetic field, and said interrogation electromagnetic field being maintained for a period of time greater than the time interval between the intermittently repeated label replies;

said at least one label including means within the label for determining the interval between the intermittently repeated label reply signals for said at least one label without reference to timing signals external to the label, and said interval varying from label to label and being greater than the time required for said label reply.

2. An identification and telemetry system as claimed in claim 1 wherein repeated replies from a plurality of labels present at one time within the interrogation field do not permanently overlap in time.

3. An identification and telemetry system as claimed in claim 1 wherein relative positions of replies from a plurality of labels present at one time within the interrogation field vary as a result of the accumulation of different intervals between replies.

4. An identification and telemetry system as claimed in claim 1 wherein the first reply from a label occurs as soon as that label enters a region of the interrogation electromagnetic field strong enough for operation of that label.

5. An identification and telemetry system as claimed in claim 1 wherein said at least one label includes oscillator and logic circuits within the label for determining said interval between replies.

6. An identification and telemetry system as claimed in claim 1 wherein said at least one label comprises an oscillator within the label for regulating said interval between replies from the label, said oscillator having a voltage dependent output frequency.

7. An identification and telemetry system as claimed in claim 6 wherein the voltage supplied to said oscillator is dependent upon the strength of the interrogation field at the position of the label.

8. An identification and telemetry system as claimed in claim 7 further comprising means for varying interrogation power to allow variation of the interval between replies from a label.

9. An identification and telemetry system as claimed in claim 1 wherein said interval between replies from a label is determined by a unique label serial number.

10. An identification and telemetry system as claimed in claim 1 wherein said interval between replies from a label varies over time in accord with a pseudo-random sequence.

11. An identification and telemetry system as claimed in claim 10 wherein said pseudo random sequence is determined by information present in the label.

12. An identification and telemetry system as claimed in claim 11 wherein information to be provided as the reply code is used also to determine said pseudo random sequence.

13. An identification and telemetry system as claimed in claim 10 wherein said pseudo random sequence is determined by information other than information in the label reply.

14. An identification and telemetry system as claimed in claim 1 wherein said at least one label includes circuits within the label that present an impedance to the label receiving antenna which varies with the signal level received by that antenna so as to allow the label to operate correctly over a relatively large range of interrogation signal strength.

\* \* \* \* \*